United States Patent

[11] 3,584,149

[72] Inventor Robert Earl Flory
Princeton, N.J.
[21] Appl. No. 857,167
[22] Filed Sept. 11, 1969
[45] Patented June 8, 1971
[73] Assignee RCA Corporation

[54] REGISTRATION APPARATUS FOR TELEVISION FILM PROJECTION SYSTEM
8 Claims, 3 Drawing Figs.

Figure 1:
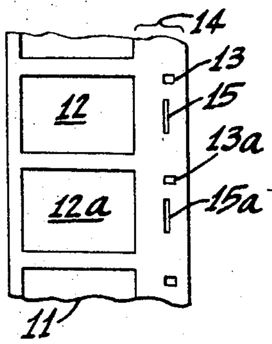

[52] U.S. Cl. .......... 178/7.2, 178/DIG. 28, 178/6.7A
[51] Int. Cl. .......... H04n 5/88
[50] Field of Search .......... 178/7.2 D, 7.4, 6.7A

[56] References Cited
UNITED STATES PATENTS 2,496,102 1/1950 McCord .......... 178/7.2D
2,818,467 12/1957 Harris et al. .......... 178/7.2D

*Primary Examiner*—Robert L. Griffin
*Assistant Examiner*—John C. Martin
*Attorney*—Eugene M. Whitacre ABSTRACT: Light of a first color from a stroboscopic light source is transmitted to the photosensitive electrode of a storage-type camera tube through a series arrangement of a first dichroic mirror, a condensing lens system, the image-bearing frames of an intermittently moved motion picture film, an objective lens system, a rotating light reflective or refractive device for moving the light replica of each image-bearing frame of the film laterally relative to the camera tube electrode, and a second dichroic mirror. Light of a second color from a continuous light source is reflected by one of the dichroic mirrors through lateral position-identifying indicia in a marginal strip of the film for a second reflection by the other dichroic mirror to a photodetector which responds to light of the second color representing the position-identifying indicia to develop triggering pulses for momentarily actuating the stroboscopic light source. The light replica of each image-bearing film frame is projected a plurality of times onto the photosensitive electrode of the camera tube and the mechanism for intermittently moving the film and the rotating light reflective or refractive device are driven by a synchronous motor energized by an alternating current power supply to which the deflection apparatus of the camera tube is locked so as to synchronize the movements of the film and the rotating device and to phase them suitably to coincide with the vertical-blanking intervals of the deflection apparatus.

INVENTOR.
ROBERT E. FLORY
BY Eugene M. Whitacre
Attorney

INVENTOR
ROBERT E. FLORY
BY Eugene M. Whitacre
Attorney

REGISTRATION APPARATUS FOR TELEVISION FILM PROJECTION SYSTEM

BACKGROUND OF THE INVENTION

This invention relates to apparatus for accurately registering film frame images onto a photosensitive electrode of a television camera pickup tube.

In television systems in which a motion picture film is projected onto the photosensitive electrode of a camera tube that is scanned by an electron beam to generate video signals representative of the information recorded in the image-bearing frames of the film, it is necessary, in order to generate proper signals, to accurately position or register with one another all light replicas of the image-bearing frames of the film on the camera tube electrode. Such a requirement is especially imperative in systems such as in U.S. Pat. No. 1,733,291 granted Jan. 31, 1956 to R. D. Kell and in U.S. Pat. No. 3,378,633 granted Apr. 16, 1968 to A. Macovski where the component color information is spatially encoded on black and white film. In such systems, the color encoding is in the form of a fine structure of color representative strips which are oriented vertically and/or at one or more angles to the horizontal dimension of the film frames. The projection of the light replicas of such a strip structure onto the photosensitive camera tube electrode and its scansion by the electron beam serve to develop video signals in the output of the camera tube which include the component color information as amplitude modulations of a plurality of relatively high frequency carrier waves. Any lateral misregister of the light replicas of the image-bearing frames of such a color-encoded film on the photosensitive camera tube electrode will produce undesired variations in the amplitude and/or phase of the developed color carrier waves. A major cause for any such lateral misregistration is the width of the sprocket holes of the film by which it is advanced through the film gate of the projection apparatus by a transport mechanism which may include a sprocket wheel or a claw device. Such sprocket holes must have sufficient original width to accommodate the transport mechanism without binding and, hence, must be at least a little wider than the hole-engaging elements of the transport mechanism. Additionally, continued use of the film tends to further widen the sprocket holes.

Even in television film projection systems which do not use such color-encoded information but, instead, have pictorial representations of an object or a scene recorded on the image-bearing frames of the film, better video signals can be developed if lateral misregistrations of the light replicas of such film frames which are projected onto the camera tube can be eliminated. Hence, in this specification and in the claims, the term "image-bearing frame" is defined as one in which there is a photographic record of an object or scene such as a true positive or negative image or an encoded representation thereof as, for example, in systems such as those of the Kell and Macovski patents.

It is an object of the invention to provide a novel registration apparatus for accurately positioning on a television camera tube light replicas of all the image-bearing frames of a motion picture film.

In accordance with the invention the television film projection system embodying the novel registration apparatus comprises a main light transmission path from a stroboscopic light source to the photosensitive electrode of a camera tube in which there is a series arrangement of a first dichroic mirror, an image-recording film and a second dichroic mirror. Each of the dichroic mirrors is angularly positioned relative to the main light transmission path and functions (1) to direct light of a first color produced by the stroboscopic light source through the image-bearing frames of the film along the entire length of the main light transmission path to the camera tube electrode and (2) to direct light of a second color along that part of the main light transmission path between the two dichroic mirrors and also along two auxiliary light transmission paths branching respectively from the dichroic mirrors. Light of the second color is continuously supplied through the auxiliary light transmission path associated with one of the dichroic mirrors for reflection thereby through a marginal strip region of the film in which lateral position-identifying indicia are recorded at a precise predetermined distance from the respective image-bearing frames. Photodetecting means, located in the auxiliary light transmission path associated with the other dichroic mirror, responds to light of the second color reflected by the other dichroic mirror and derived from the position-identifying indicia to develop triggering pulses for momentarily actuating the stroboscopic light source. The registration apparatus also includes light-direction-changing means located in the main light transmission path between the film and the dichroic mirror having the auxiliary light transmission path which includes the photodetecting means. The light-direction-changing means is moved synchronously with the film-advancing mechanism and with the electron beam scansion of the camera tube electrode so as to sweep the light of the second color derived from the position-identifying indicia across the dichroic mirror for reflection thereby to the photodetecting means at precisely the proper time during a vertical blanking interval to project a light replica of an image-bearing frame produced by light of the first color onto the camera tube electrode in exact registration with all light replicas of the image-bearing frames of the film.

Figure 2:
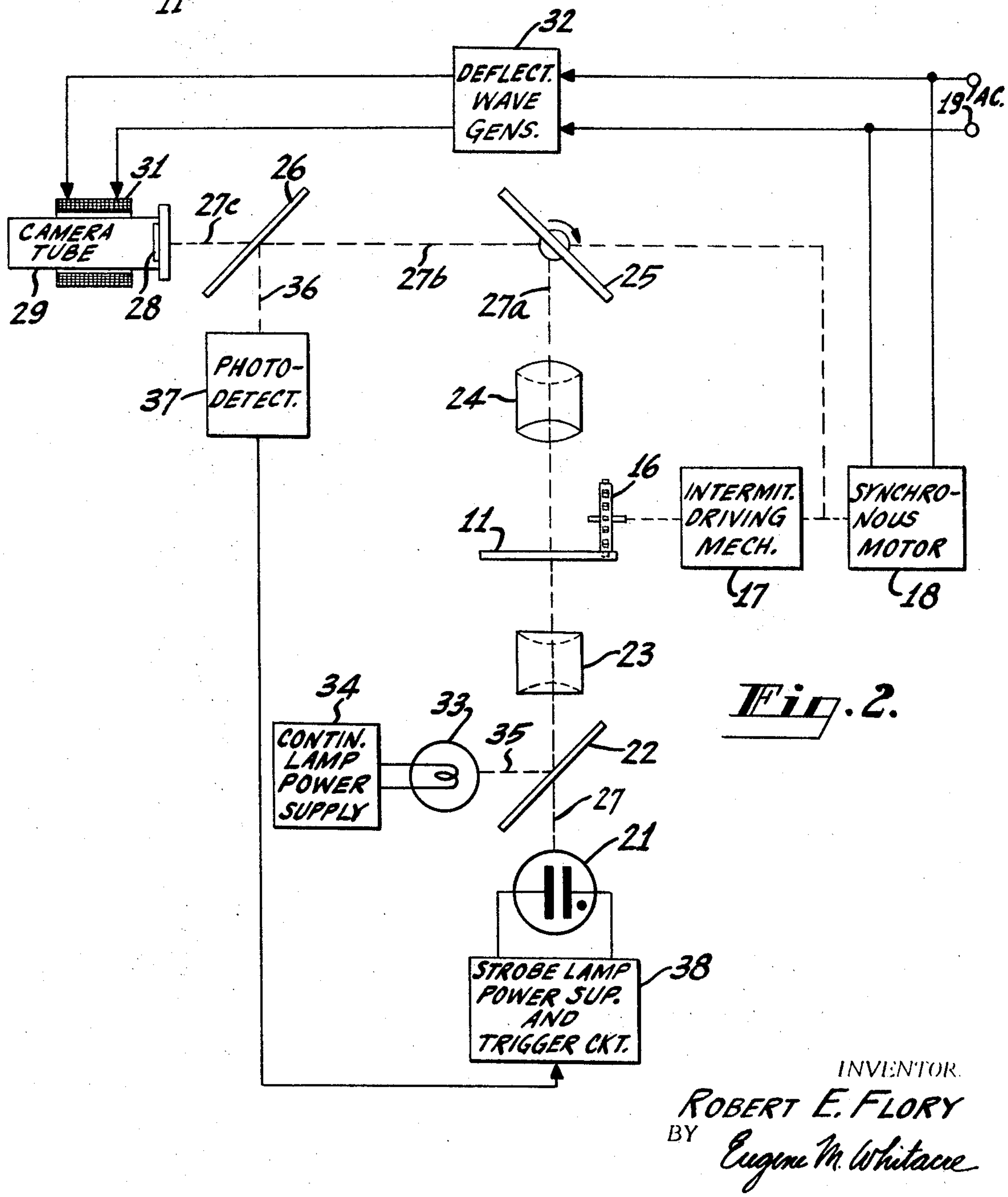
Figure 3:
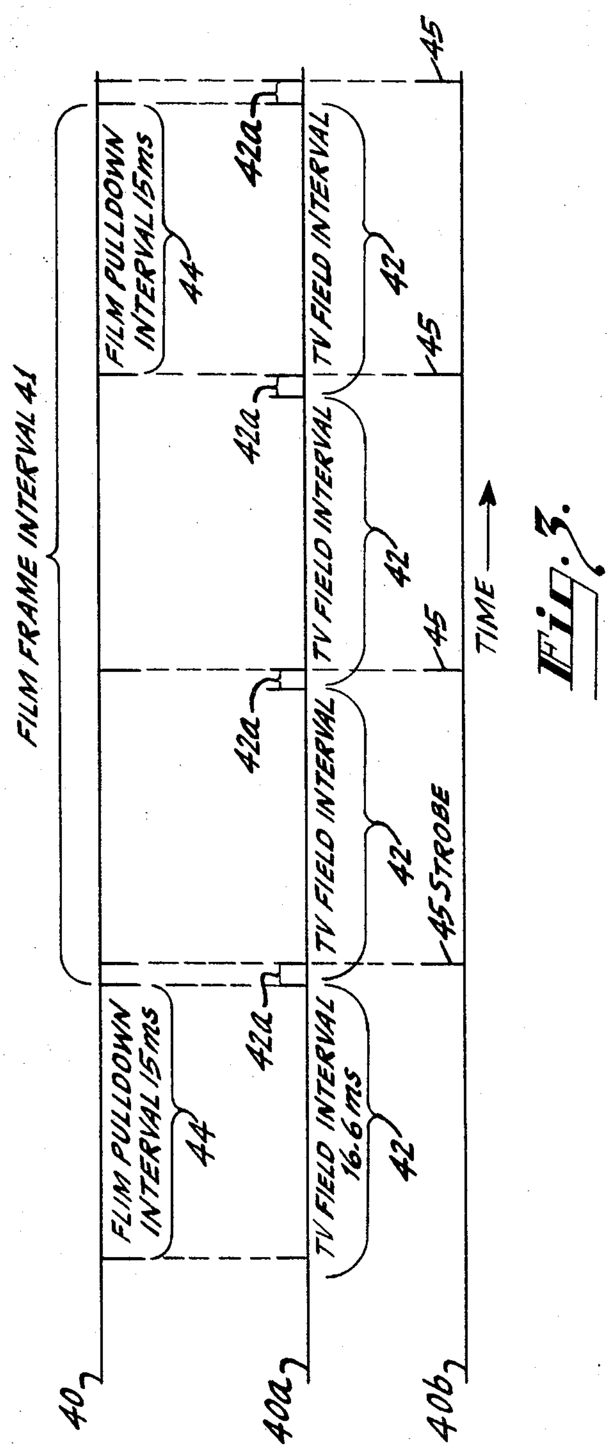

For a more specific disclosure of the invention, reference may be had to the following description of a presently preferred embodiment thereof which is given in conjunction with the accompanying drawing, of which:

FIG. 1 is a fragmentary section of a typical motion picture film which may be employed with the invention; and FIG. 2 is a diagrammatic representation of the presently preferred embodiment of the invention; and FIG. 3 is a timing diagram illustrating the sequence of operation of the apparatus illustrated in FIG. 2.

In FIG. 1 the example of the type of film 11 used with the invention has a succession of image-bearing frames such as 12, 12*a*, etc., and a series of sprocket holes 13, 13*a*, etc., in a marginal strip 14 adjacent the frames 12 etc. Also recorded in the marginal strip 14 is a series of lateral-position-identifying indicia 15, 15*a*, etc. The indicia 15, 15*a*, etc., are located at precisely the same predetermined distance laterally of the film 11 from the vertical sides of their respectively associated image-bearing frames 12, 12*a*, etc. The indicia 15 and 15*a* may be elongated slots in the film 11 and the marginal strip 14 of film 11 may be purposefully fogged or exposed so that it is darkened so that light will pass through the slots 15 and 15*a* but not through the marginal area 14 of film 11.

In FIG. 2 the motion picture film 11, shown in transverse cross section, is advanced intermittently normal to the plane of the drawing by any conventional film transport apparatus, in this case including a sprocket wheel 16, and an intermittent drive mechanism 17 powered by a synchronous motor 18 which is energized by a connection to a source of alternating current at terminals 19.

The optical system in which the registration apparatus of the invention is embodied includes stroboscopic light source such as a xenon flash lamp 21, a first dichroic mirror 22, a condensing lens system 23, the film 11, an objective lens system 24, a rotating mirror 25, driven as indicated by the synchronous motor 18, and a second dichroic mirror for directing short, intense, intermittent light flashes through the film along a main light transmission path 27, 27*a*, 27*b* and 27*c* to the photoconductive electrode 28 of a vidicon type of camera tube 29. Where the invention is used in a television system such as that of the previously mentioned Macovski patent, for example, the light reaching the camera tube electrode 28 has a structure of fine color representative strips which are oriented vertically and/or at one or more angles to the horizontal direction in which the camera tube electrode 28 is scanned by an electron beam (not shown). In order that the component color signals developed by the camera tube 29 be separately and accurately recoverable from the carrier waves produced by the beam scansion of the electrode 28, it therefore, is particularly important that all light replicas of the image-bearing frames of the film 11 be projected onto the camera tube electrode 28 in precise registration with one another.

In the specific projection system of FIG. 2 the film 11 is advanced at the rate of 20 frames per second and the photosensitive electrode 28 of the camera tube 29 is scanned by an electron beam under the control of a deflection yoke 31, energized by a conventional deflection wave generator 32 at, for example, the U.S. standard television rate of 60 fields per second. Hence the light replica of each image-bearing frame 12, 12*a*, etc., of the film 11 is projected onto the camera tube electrode 28, and scanned by the electron beam, three times. In order to accomplish this, the light-direction-changing mirror 25 must be rotated three times for each operation of the sprocket wheel 16 by the intermittent Synchronism including the sprocket wheel 16 and the driving mechanism 17 with the rotating mirror 25 is achieved by driving them both by the synchronous motor 18. Both of these operations are synchronized with the electron beam scansion of the camera tube electrode 28 by locking the deflection wave generator 32 to the alternating current present at the terminals 19 to which the synchronous motor 18 is connected. The rotation of the mirror 25 is phased to direct light from the lateral-position-identifying indicia 15, 15*a*, etc., of the film 11 only during the vertical-blanking intervals between field scansions of the camera tube electrode 28. The intermittent-film-advancing apparatus including the sprocket wheel 16 and the driving mechanism 17 is phased to operate during every third field scansion of the camera tube electrode 28.

FIG. 3 illustrates the sequence of operation of the film system for a 60-field-per-second readout of a 20-frame-per-second film. A complete cycle of operation occurs in a film frame interval 41 shown on line 40. As indicated by the vertical dashed lines connecting lines 40 and 40*a*, there are three television field intervals 42 of approximately 16.6 msec. duration each during a single film frame interval 41. Thus, each frame of film will be displayed for three television fields. Film pulldown is accomplished during an interval 44 which is preferably 15 msec. or less once each film frame interval 41. Each television field interval 42 contains a vertical retrace interval 42*a*. Following each retrace interval 42*a*, the strobe lamp is triggered at intervals 45 shown on line 40*b* for producing the momentary flash of light for storing the film frame image on the photosensitive element of the television camera pickup tube. Thus, the film is stationary as the strobe lamp is flashed. Following the strobe lamp flash, the stored image is scanned by the electron beam in a conventional manner for producing the video signals.

The optical system in which the registration apparatus of the invention is embodied also includes a continuous light source such as a tungsten filament lamp 33 which is energized by a power supply 34 and is located in an auxiliary light transmission path 35 adjacent the first dichroic mirror 22. This dichroic mirror is of a character to transmit the bluish color light produced by the stroboscopic light source lamp 21 and to reflect the yellowish color light produced by the continuous light source lamp 33. This yellowish color light is directed by the dichroic mirror 22 along the main light transmission path including sections 27*a* and 27*b* thereof to the second dichroic mirror 26 which is of a character to transmit the bluish light from the xenon lamp 21 and to reflect the yellowish light from the tungsten lamp 33 through an auxiliary light transmission path 36 associated with the dichroic mirror 26 to a photodetector 37. The photodetector, when actuated, develops triggering pulses for impression upon the trigger circuit of a power supply 38 for the actuation of the flash lamp 21 at appropriate times and in a manner to be described. The image of the filament of lamp 33 is focused by film objective lens 24 onto the photodetector 37. It has been determined that by properly positioning the lamp 33 its light will be restricted to the marginal area 14 of film 11 and will not pass through image portions 12 and 12*a* of film 11 to trigger strobe lamp 21 erroneously. A shutter mechanism (not Shown) of a type commonly utilized in film projectors and disposed adjacent film 11 operates during film pulldown time to prevent the continuous light from lamp 33 from passing through sprocket holes 13 and 13*a* of film 11 to trigger strobe lamp 21 at the wrong time. The shutter mechanism is open during the interval when film 11 is stationary, thereby allowing the film registration apparatus to function as described.

In the operation of the described motion picture film projection system embodying the registration apparatus of the invention, assume that while the electron beam of the camera tube 29 is scanning the photosensitive electrode 28, the intermittent driving mechanism 17 operates the sprocket wheel 16 to move the image-bearing frame 12 of the film 11 into position in the gate (not shown) of the projector for exposure to the continuous light from the tungsten lamp 33 and to the short, intense light flash from the xenon lamp 21 when actuated. During the nest succeeding vertical-blanking interval the rotating mirror 25 is moved into position to direct light form the tungsten lamp 33 through the lateral-position-identifying indicium 15 to the photodetector 37 which results in the actuation of the xenon lamp 21 to flash a first light replica of the image-bearing film frame 12 onto the photosensitive electrode 28 of the camera tube 29. The information which thus is stored on the electrode 28 is converted by the electron beam during the next succeeding field period into video signals representing such information. During the following vertical-blanking interval the rotating mirror, on its next revolution, again directs light from the tungsten lamp 33 and representative of the indicium 15 to the photodetector 37 to flash a second light replica of the film frame 12 onto the camera tube electrode 28. The actuation of the flash lamp 21 under the control of the film indicium 15 insures that the second light replica of the film frame 12 projected onto the electrode 28 is in precise register with the first light replica of this frame. After a second scansion of the camera tube electrode 28 a third light replica of the film frame 12 is projected onto the electrode by a repetition of the described operation of the registration apparatus of the invention.

While a third scansion is being made of the camera tube electrode 28 with the third light replica of the film frame 12 stored thereon, the intermittent driving mechanism 17 operates the sprocket wheel 16 to move the image-bearing frame 12*a* of the film 11 into the projector gate to replace the frame 12. The described projection of a light replica of this frame onto the camera tube electrode 28 which is subsequently scanned to develop representative video signals is repeated. Because of the precise identical locations of the lateral-position-identifying indicia 15 and 15*a* relative to their respectively associated image-bearing film frames 12 and 12*a*, the projection onto the camera tube electrode 28 of the light replica of the frame 12*a* is in precise register with the light replicas of the frame 12.

It should be understood that the principles of the invention may be used in a system in which the light-direction-changing means, such as the rotating mirror 26, need not make a full 360° rotation for each light projection onto the camera tube 29 and the photodetector 37. Instead, it need be moved by a suitable conventional cam mechanism, for example, only enough to compensate for the largest expected lateral positional error. Also, a refractive element may be used instead of the illustrated reflective element. Furthermore, the present system may also include the novel optical apparatus of the concurrently filed application of Robert E. Flory and William J. Hannan, Ser. No. 856,952, filed Sept. 9, 1969, entitled CROSSTALK REDUCTION IN FILM PLAYER. In such a case the continuous light source lamp 33 would be located in the auxiliary light transmission path 36 in the position shown in FIG. 2 of the photodetector 37 and the photodetector would be located in the auxiliary light transmission path 35 in the position shown in FIG. 2 of the lamp 33.

A television film projection system embodying the registration system of the invention has a number of advantages in addition to that of enabling the development of high quality color representative video signals from black and white film on which the color information is spatially encoded in the manner of the Kell and Macovski patents, for example. One of such additional advantages is its adaptability to use with a motion picture film in which colored pictorial representations of an object or scene are recorded on the image-bearing film frames. In such a case a strip type encoding filter of the character disclosed in the Kell and Macovski patents is inserted into the main light transmission path in front of the camera tube 29 of FIG. 2. Another advantage is that, at the described rate of 20 frames per second, the film consumption is significantly lower than in those systems in which the film is continuously moved at a 60-frame-per-second rate. Moreover, in a system embodying the present invention, many type of available, standard film projection apparatus may be used both in duplicating the film and in converting the information recorded in the image-bearing frames into video signals as described.

What I claim is:

1. In a television film projection system, registration apparatus for accurately positioning on a storage-type photosensitive electrode of a camera tube during each vertical blanking interval a momentary light replica, produced by light from a stroboscopic light source, of each of a series of image-bearing frames of an image recording film also having, in a marginal strip adjacent said image-bearing frames, lateral-position-identifying indicia having a precise spacing from respective ones of said image-bearing frames, said registration apparatus comprising:

a series arrangement in a main light transmission path from said stroboscopic light source to the photosensitive electrode of said camera tube of a first dichroic mirror, said film and a second dichroic mirror, each of said dichroic mirrors being angularly positioned relative to said main light transmission path and functioning (1) to direct light of a first color emanating from said stroboscopic light source through the image-bearing frames of said film and along said main light transmission path to said camera tube electrode and (2) to direct light of a second color along that part of said main light transmission path between said dichroic mirrors and also along first and second auxiliary light transmission paths branching respectively from said first and second dichroic mirrors;

light-producing means located in one of said auxiliary light transmission paths for continuously supplying light of said second color to the dichroic mirror associated with said one auxiliary light transmission path;

photodetecting means located in the other one of said auxiliary light transmission paths and responsive to light of said second color received from the dichroic mirror associated with said other auxiliary light transmission path and derived from said lateral-position-identifying indicia to develop triggering pulses for momentarily actuating said stroboscopic light source to produce short duration flashes of light of said first color for projection through respective ones of said image-bearing frames of said film; and light-direction-changing means located in said main light transmission path between said film and said dichroic mirror associated with the auxiliary light path including said photodetecting means for producing lateral movement relative to said camera tube electrode of a light replica of each of said image-bearing frames of said film, whereby said stroboscopic light source is actuated only when the light replica of each image-bearing frame is accurately positioned on said camera tube electrode.

2. In a television film projection system having registration apparatus as defined in claim 1, wherein said system includes means for horizontally and vertically scanning said photosensitive electrode of said camera tube and wherein said registration apparatus further includes:

means for synchronizing the movements of said light-direction-changing means with said film movements and with said vertical scanning of said camera tube electrode.

3. Registration apparatus as defined in claim 2, wherein:

said synchronizing means is of a character to phase said light replica movements on said camera tube electrode to occur during blanking intervals of said vertical-scanning cycles.

4. Registration apparatus as defined in claim 3, wherein:

said synchronizing means is of a character to effect a plurality of projections of said light replicas and the horizontal and vertical scansions of said camera tube electrode for each image-bearing frame of said film.

5. Registration apparatus as defined in claim 4, wherein:

said film is moved intermittently, said intermittent movement of said film and said movement of said light-direction-changing means is effected by a synchronous motor energized from an alternating current power supply.

6. Registration apparatus as defined in claim 5, wherein:

said horizontal and vertical scanning means is locked to said alternating current power supply.

7. Registration apparatus as defined in claim 6, wherein:

said light-direction-changing means is a reflective device.

8. Registration apparatus as defined in claim 7, wherein:

said reflective light-direction-changing means is a rotating mirror.

UNITED STATES PATENT OFFICE

CERTIFICATE OF CORRECTION

Patent No. 3,584,149 Dated June 8, 1971

Inventor(s) Robert Earl Flory

It is certified that error appears in the above-identified patent and that said Letters Patent are hereby corrected as shown below:

Column 1, line 18, that portion reading "1,733,291" should read -- 2,733,291 --.
Column 3, line 18, that portion reading "intermittent Synchronism including" should read -- intermittent driving mechanism 17. Synchronism of the intermittent film-advancing apparatus including --.
Column 4, line 21, that portion reading "nest" should read -- next --; line 22, that portion reading "form" should read -- from --.

Signed and sealed this 28th day of December 1971.

(SEAL)
Attest:

EDWARD M.FLETCHER,JR.
Attesting Officer

ROBERT GOTTSCHALK
Acting Commissioner of Patents